April 24, 1934.　　　F. E. CHRISTOPHER　　　1,955,946
CRUSHER
Filed July 21, 1931　　　2 Sheets-Sheet 1
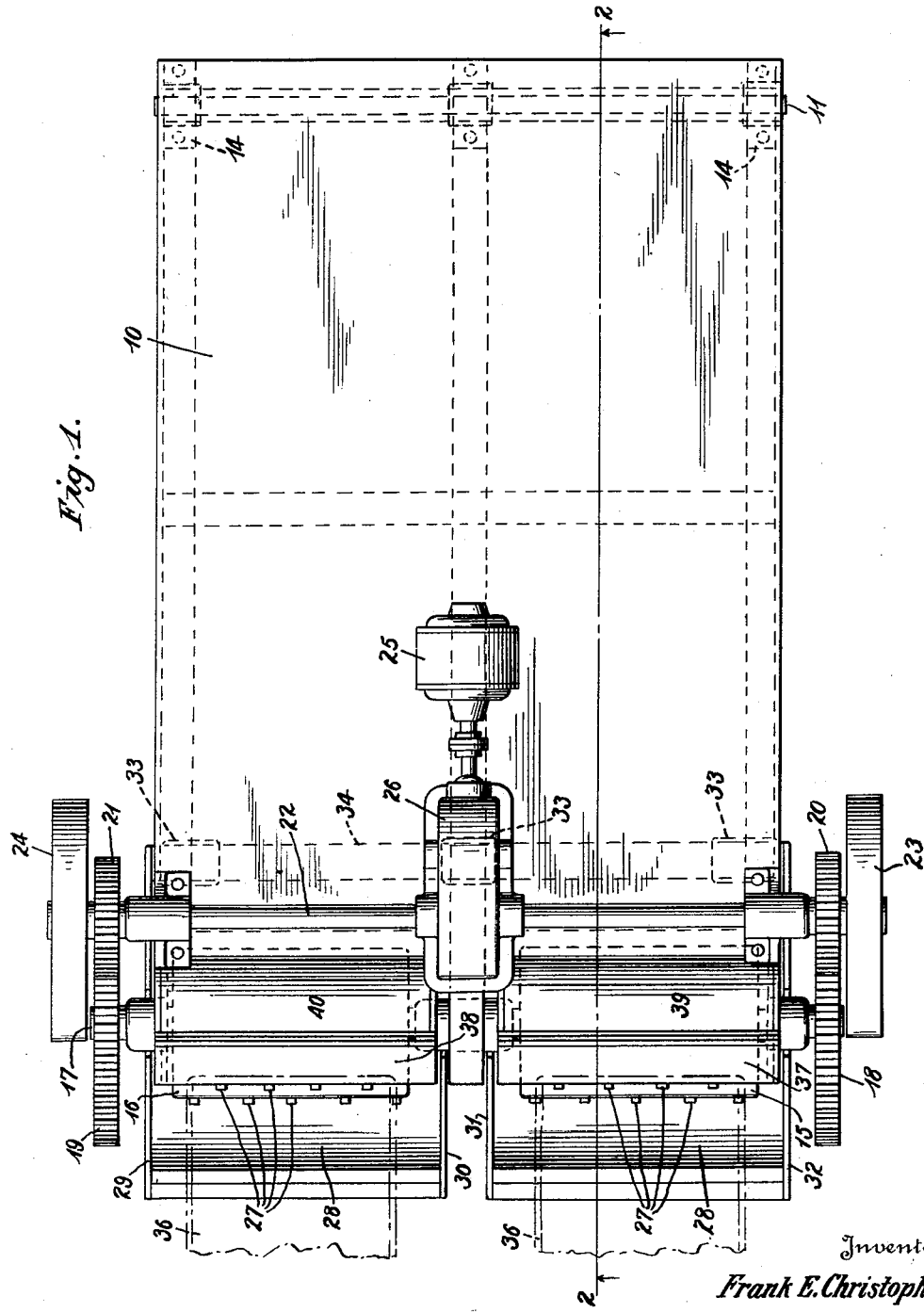
Inventor
Frank E. Christopher April 24, 1934.  F. E. CHRISTOPHER  1,955,946
CRUSHER
Filed July 21, 1931  2 Sheets-Sheet 2
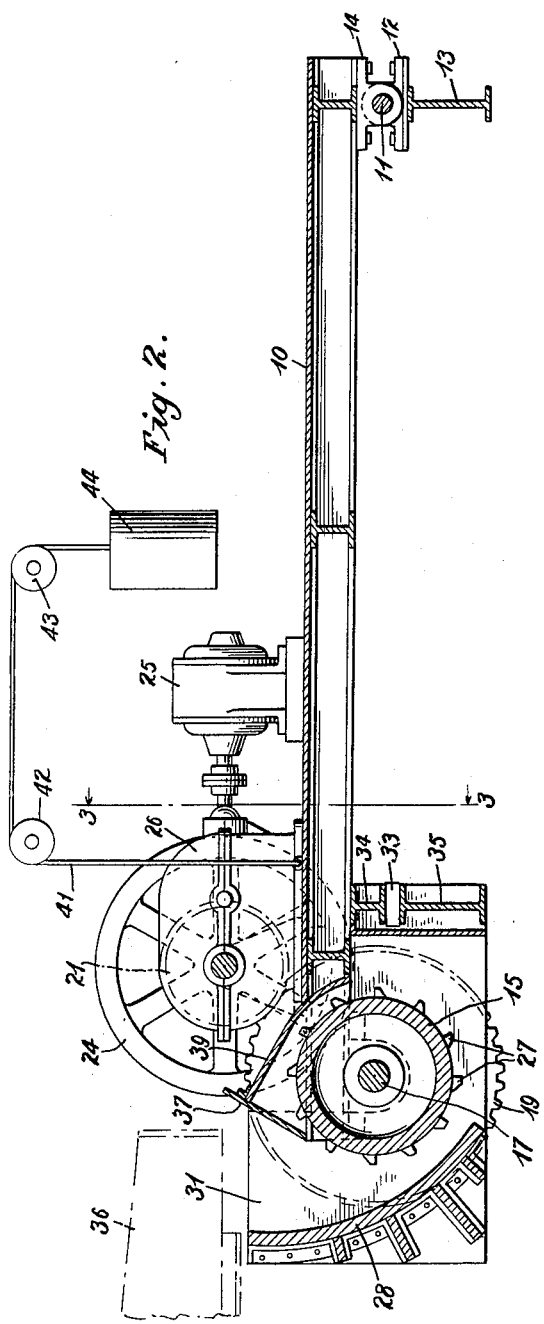
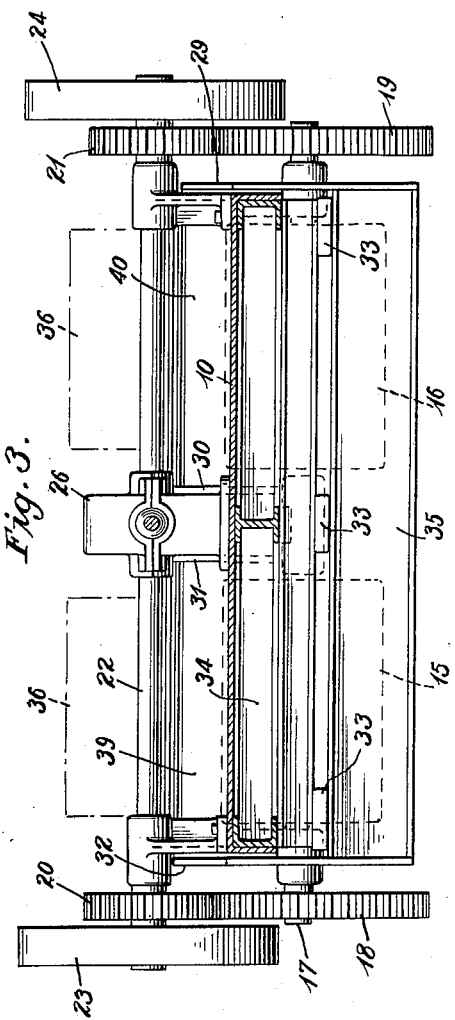
Inventor
Frank E. Christopher
By Brown & Phelps
Attorneys Patented Apr. 24, 1934

1,955,946

UNITED STATES PATENT OFFICE 1,955,946

CRUSHER

Frank E. Christopher, Morgantown, W. Va.

Application July 21, 1931, Serial No. 552,265

11 Claims. (Cl. 83—53)

The invention relates to crushers and has as an object the provision of a device of this character particularly designed for crushing coal, capable of a large output with a minimum of supervision or inspection.

It is an object of the invention to provide a crusher readily adjustable for different sizes of output.

It is a further object of the invention to provide a crusher having fixed concave and yieldable rolls held in normal relation to the concave by the weight of the rolls and power drive means, which may lift to pass material which cannot be crushed.

It is a further object of the invention to provide a crusher having rolls spaced longitudinally so as to deliver the output to parallel screens to provide a space between the screens for occupancy by coal pickers.

Further objects of the invention will appear from the following description when read in connection with the accompanying drawings showing an illustrative embodiment of the invention and wherein:—

Fig. 1 is a plan view;

Fig. 2 is a longitudinal vertical section on line 2—2 of Fig. 1; and

Fig. 3 is a vertical transverse view on line 3—3 of Fig. 2.

As shown the device comprises a supporting platform 10 pivotally mounted upon a shaft 11 supported in bearings 12 as upon a support 13, bearings 14 being secured to the platform to support the latter upon the shaft. A pair of longitudinally spaced crushing rolls 15, 16 are shown secured upon a shaft 17 journalled in bearings adjacent the end of the platform opposite the pivot.

For drive of the crushing rolls, there are shown gears 18, 19, one keyed upon each end of the shaft 17 in mesh with gears 20, 21, keyed upon a drive shaft 22, fly wheels 23, 24 being also keyed upon the ends of the shaft 22. The shaft 22 is adapted to be driven by a motor 25 through a speed reducing gear of any suitable character housed in casing 26.

The crushing rolls 15, 16 are shown as provided with crushing teeth 27 and to coact with the toothed rolls there is shown a fixed concave 28 stationarily supported in spaced relation to the rolls. Plates 29, 30, 31, 32 are shown closing the spaces at the ends of the concaves to guide material through the crushing space to the outlet.

The platform 10 with its load is shown as supported upon blocks 33 placed between the I-beam support 34 movable with the platform and the fixed support 35.

By jacking up the platform 10 to cause movement about its pivot, the blocks 33 may be changed for thicker or thinner blocks to secure the desired spacing between the crushing rolls and the concave for any desired maximum sized product.

The material may be delivered to the crusher as by feed means shown in dot and dash lines at 36 and shields 37, 38 are shown to guide the material to the space between the concave and the rolls. Preferably aprons 39, 40 may be provided to extend from the rear surfaces of the shields 37, 38 to cover the top of the rolls to prevent accidents to workmen or access of material to the tops of the rolls.

If desired, counterweight means may be provided to take some of the weight of the platform and its load so as to allow any non-crushable material to more readily lift the platform and be passed by the crusher. To this end there is shown a cable 41 secured to the platform and passing about sheaves 42, 43 with a counterweight 44 secured thereto. The showing of the counterweight is omitted from Fig. 1 for clarity.

The operation of the device will be clear from the above description. Minor changes may be made in the physical embodiment of the invention within the scope of the appended claims without departing from the spirit thereof.

I claim:

1. A crusher comprising, in combination, a support, a pivot therefor, a crushing roll journaled upon said support, a motor mounted on said support between said pivot and said roll geared to drive said roll, and a stationary concave partially underlying said roll and coacting with said roll to crush material, said support movable about said pivot to pass non-crushable material between said roll and concave.

2. A crusher comprising, in combination, a support pivoted on a horizontal axis and upwardly movable about said pivot, a crushing roll journalled upon said support, a motor and gearing mounted on said support between said pivot and said roll for driving said roll, a fixed concave partially underlying said roll and coacting with said roll to crush material and means to adjust said support about its pivot to vary the spacing between said roll and concave.

3. A crusher comprising, in combination, an upwardly movable support, a toothed crushing roll journaled on said support, a motor mounted on said support, gearing journaled on said support to drive said roll from said motor, a fixed concave partially underlying said roll and coacting with said roll to crush material, the weight of said support and said devices carried thereby reacting against the crushing thrust of said roll and yieldable upwardly to pass non-crushable material past the concave.

4. A crusher comprising, in combination, an upwardly movable support, a toothed crushing roll journaled on said support, a motor mounted on said support, gearing journaled on said support to drive said roll from said motor, a fixed concave partially underlying said roll and coacting with said roll to crush material, a shield covering the upper portion of the periphery of said roll, the portion thereof adjacent the concave sloping downwardly to deflect material into the crushing space, the weight of said support and said devices carried thereby reacting against the crushing thrust of said roll and yieldable upwardly to pass non-crushable material past the concave.

5. A crusher comprising, in combination, a platform pivotally supported upon a horizontal axis adjacent an end thereof, said platform upwardly movable about said pivot, a crushing roll carried by a shaft journaled upon and adjacent the opposite end of said platform, means mounted on said platform to drive said roll, a fixed concave partially underlying and coacting with said roll to crush material, a support for said platform adjacent said roll and adjustment blocks between said support and platform whereby the spacing between the roll and concave may be adjusted by varying the thickness of said blocks.

6. A crusher comprising, in combination, a support, a pivot therefor, a crushing roll journaled upon said support, a motor mounted on said support between said pivot and said roll geared to drive said roll, a stationary concave partially underlying and coacting with said roll to crush material, said support movable about said pivot to pass non-crushable material between said roll and concave, and a counter weight to reduce the weight to be lifted by the roll when passing non-crushable material.

7. A crusher comprising, in combination: a downwardly sloping concave; a crusher roll overlying the lower portion of said concave; a frame upon which said roll is revolubly mounted; a motor and gearing mounted upon the frame for drive of said roll; said frame and the devices carried thereby freely movable upwardly against gravity to pass non-crushable material between the roll and concave; and a fixed support underlying and supporting said frame.

8. A crusher comprising, in combination: a downwardly sloping concave; a crusher roll overlying the lower portion of said concave; a frame upon which said roll is revolubly mounted; a motor and gearing mounted upon the frame for drive of said roll; said frame and the devices carried thereby freely movable upwardly against gravity to pass non-crushable material between the roll and concave; a fixed support underlying and supporting said frame, and means to adjust the elevation at which the frame is held by said support, to vary the spacing of said roll and concave.

9. A crusher comprising, in combination: a frame pivotally supported adjacent one end; a toothed crusher roll carried by a shaft mounted in bearings carried by side members of said frame at the remaining end thereof; a gear wheel secured at each end of said shaft; a counter shaft journaled in bearings carried by said frame; gear wheels in mesh with the first named gear wheels and secured upon said counter shaft; a fly wheel secured upon each end of one of said shafts; a motor mounted on said frame and geared to said counter shaft; a fixed member underlying said frame distant from its pivot to support the weight of the same and of the devices carried thereby, and a downwardly sloping concave partially underlying said roll; said frame, roll and driving means freely movable upwardly about said pivot to pass non-crushable material between the roll and concave.

10. Crushing mechanism comprising, in combination: a stationary structural element; a support resting thereon and movable upwardly therefrom against gravity; a crusher roll journalled on said support; means carried by said support to drive said roll; and a stationary crushing element, its surface downwardly converging with the periphery of said roll and coacting with the roll to crush material deposited in said converging space; said support and parts carried thereby liftable by reaction stress between said roll and non-crushable material finding access to said space.

11. Crushing mechanism, comprising, in combination; a support pivotally mounted adjacent one end thereof and upwardly swingable about said pivot; a crushing roll journaled on the upwardly movable end of said support; means carried by the support to drive said roll; and a fixed wall, its surface downwardly converging with the surface of said roll and coacting with the roll to crush material deposited in the converging space; whereby reaction between the roll and non-crushable material finding access to said space will cause said roll and support to be lifted to pass said non-crushable material.

FRANK E. CHRISTOPHER.